Patented Nov. 1, 1927.

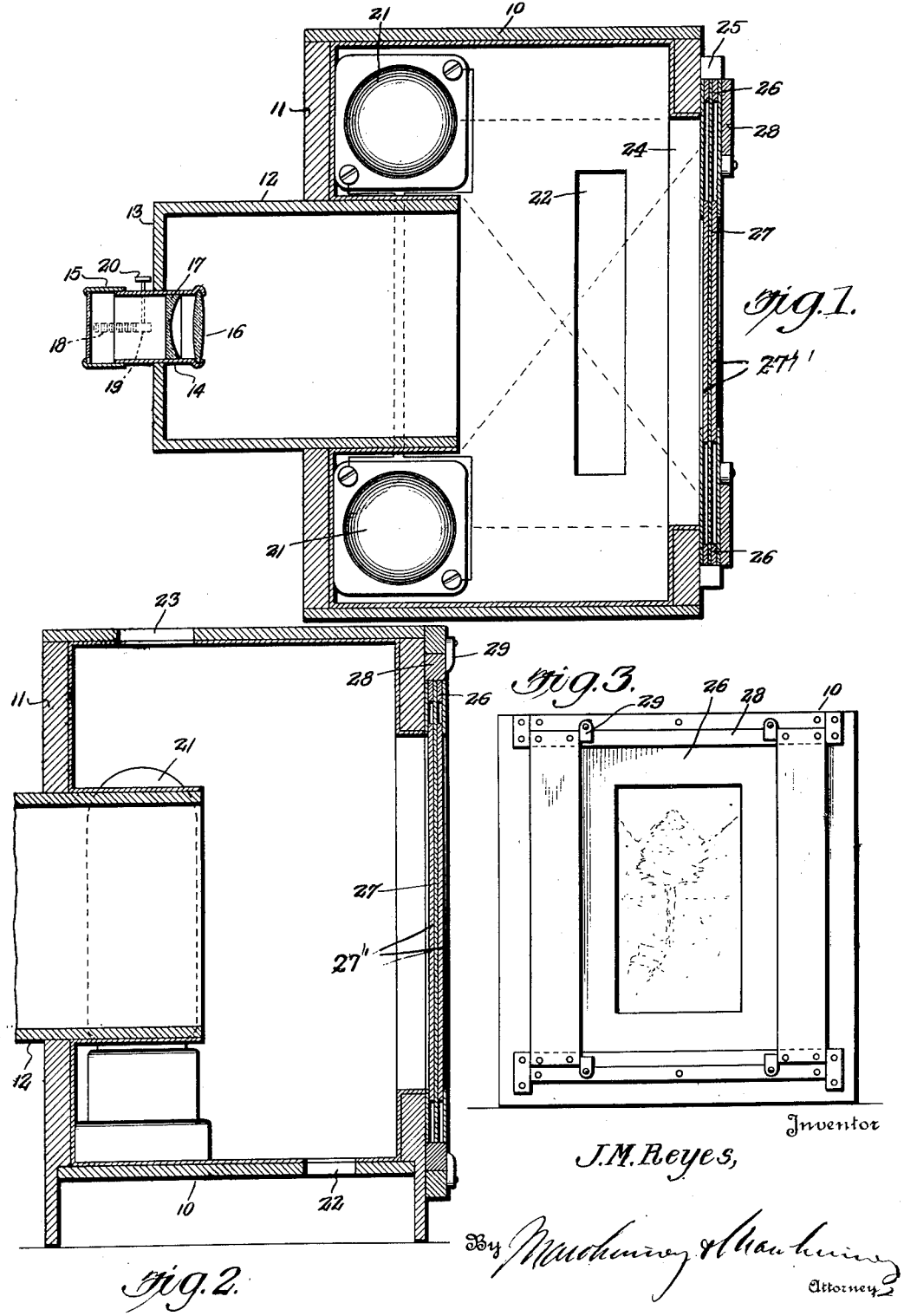

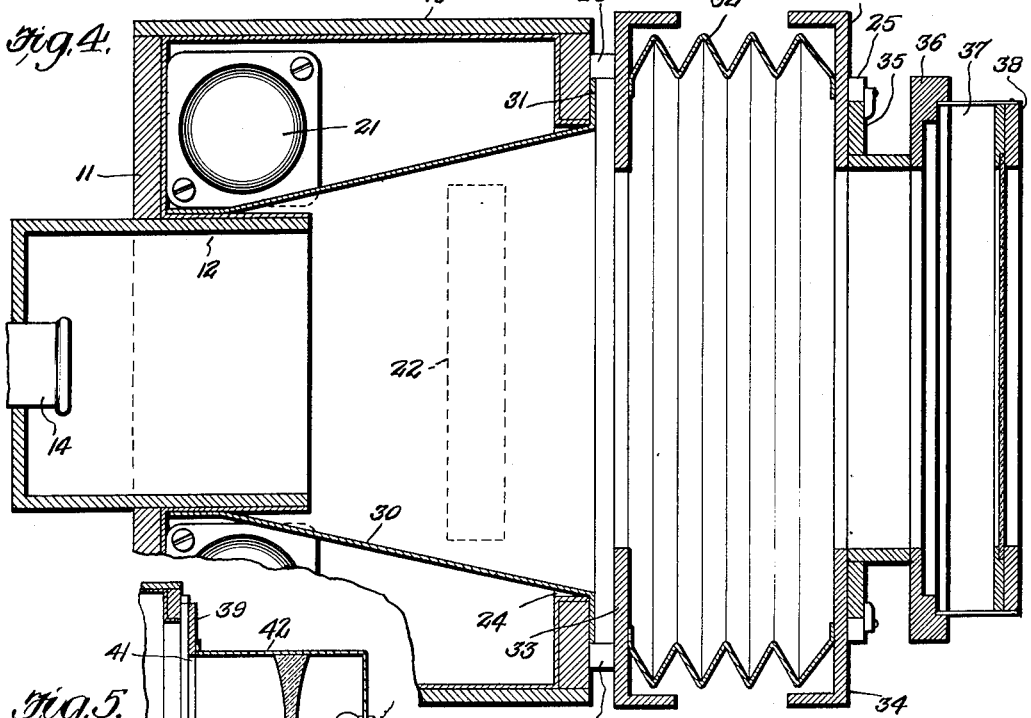
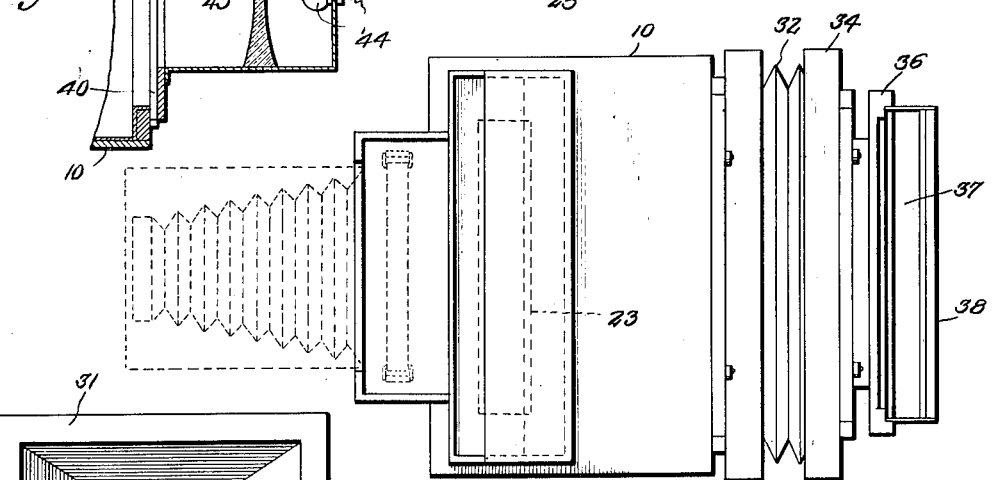

1,647,814

UNITED STATES PATENT OFFICE.

JOSEPH M. REYES, OF POUGHKEEPSIE, NEW YORK.

COMBINED CAMERA AND PROJECTOR.

Application filed August 8, 1925. Serial No. 49,034.

The present invention has reference to apparatus for taking pictures and for projection purposes, and has for an object to provide a combined structure, which may be adjusted for other use without requiring separate and special apparatus for accomplishing these purposes.

Briefly, the invention embodies a structure of apparatus for opaque projection, and a converting partition member adjustably and removably fitted in the apparatus for converting the same for use under all conditions requiring a dark chamber, or wherein light must be excluded.

Another object of the invention is to provide a camera and projector box with means for supporting various instrumentalities for use in the taking of pictures, in opaque projection, in making enlargements and transparent or direct projection.

With the foregoing and other objects in view, the invention will be more fully described hereinafter, and will be more particularly pointed out in the claim appended hereto.

In the drawings, wherein like symbols refer to like or corresponding parts throughout the several views, Figure 1 is a horizontal section taken through a combined camera and projector constructed according to the present invention, and adjusted for use in opaque projection.

Figure 2 is a longitudinal vertical section taken through the same.

Figure 3 is a reduced rear elevation of the device, showing one means of attaching the picture carrier to the rear wall of the device.

Figure 4 is a horizontal section taken longitudinally through the device converted for use where exclusion of light is essential, and showing a removable and interchangeable frame for carrying the sensitized elements.

Figure 5 is a detail longitudnal section taken through a direct projection device for interchangeable mounting with the sensitized element carrier shown in Figure 4.

Figure 6 is a detail rear elevation of the light excluding partition or member, and Figure 7 is a top plan view of the apparatus of Figure 4, showing a slight modification at the forward end thereof for supporting a camera or the like detachably in lieu of the permanent objective lens mounting shown in Figure 4.

Referring to the drawings, and first to Figures 1, 2 and 3, the apparatus comprises a box or casing 10, of any suitable size and configuration, and which has a front wall 11 through which may be mounted a sleeve 12 projecting in opposite directions through the wall, into the casing or box 10 and protruding therefrom the desired distance. The sleeve 12 is partially closed at its outer end by an outer wall 13 through which is fitted the objective 14 of any suitable type for the various types of work which are to be accomplished by use of this apparatus. The objective 14, as shown in the drawings, is of the changeable focus type and comprises the outer sleeve into which is slidably fitted the inner sleeve 15, the sleeves respectively carrying the lenses 16 and 17 for adjustment toward and from each other to change the focus, such adjustment being effected by a rack 18 on the inner sleeve, which meshes with a pinion 19 carried on a thumb shaft 20 arranged for convenient access at the exterior of the sleeves.

Arranged in the forward corners of the casing or box 10 is a pair of lamps 21, and the inner end of the sleeve 12 extends inwardly from the front wall 11 a distance sufficient to cut off light rays from the lamp 21 which would otherwise reach the objective 14. The box 10 is provided in its bottom with an air inlet opening or slot 22, and in its top is provided with an air outlet opening 23 for the proper ventilation of the box 10 during the burning of the lamps.

The rear wall of the box 10 is provided with a relatively large opening 24 and spaced about the marginal edge of the opening, and mounted on the outer side of the rear wall is a centering bead 25, which is adapted to receive therein interchangeable frames for use with the box 10 to produce the different results desired.

In Figures 1, 2 and 3 a picture carrier frame 26 is shown provided with edgewise opening slits for the reception of pictures 27 in post card form or the like, which are to be projected. The frame 26 is provided with a central opening of suitable size to expose the pictures on the post card 27 and the central opening in the frame 26 extends entirely therethrough, so that a post card 27 may be exposed at both sides of the frame. The post card 27 may be made up of a main backing strip or sheet upon the opposite sides of which are secured picture sheets 27' adapted to be exposed through the opposite sides of the mat or frame part 26 so that the frame may be reversed in position to expose first one picture sheet 27', and then the other. The frame 26 is slidably mounted in a guide frame 28, which also fits against the rear wall of the box 10, and within the bead 25, so as to slidably support the frame 26 and admit of the insertion and withdrawal of a number of such frames 26 in effecting a series of projections. The guide frame 28 may be held in position by a plurality of turn buttons 29 suitably spaced about the marginal edge of the opening 24 to admit of the quick and easy removal of the frame 28 and the substitution of other frames therefor as will hereinafter appear.

The device so far described is adapted for use in opaque projection, and when it is desired to utilize the device with sensitized elements, or transparent direct projection requiring the box or chamber 10 to be dark, a removable light excluding sleeve or member 30 is employed, the same being reduced at one end and closely fitting about the inner end of the sleeve 12, while the other end of the light excluding member 30 flares backwardly and may have a seating flange 31, which overlaps the rear wall of the box 10 at the marginal edge of the opening 24. The forward end of the light excluding member 30 may be given any suitable configuration to fit about the sleeve 12, and may be extended for engagement against the front wall 11 of the box. By use of this member 30 any light entering the box 10 through the vent slots 22 and 23, or otherwise is excluded from the space or passage through the box 10 between the objective 14 and the rear wall of the box.

It may be desirable when using the device as a camera to employ a bellows section 32. In this instance the forward end of the section 32 is provided with a frame 33 adapted to fit in the bead 25 and take the place of the guiding frame 28 on the back wall of the box 10. The same fastening devices 29 may thus be utilized when the frames are interchanged. The rear end of the bellows 32 is provided with a rear wall 34, which corresponds to the rear wall of the box 10 in supporting a bead 25 within which may be fitted, interchangeably, other frames for carrying sensitized elements, condensing lenses, lights and the like used for different purposes.

In Figure 4 a removable frame 35 is shown as attached to the wall 34 of the bellows. The frame 35 carries a socket section 36 in to which, as shown in the present instance, is removably placed a film pack 37. The film pack 37 is held by the rear wall 38 of the socket, which is yieldably connected to the front wall of the socket 36 in any well known manner.

Of course the film pack 37 may be substituted by plate holders, or by any other suitable means for carrying sensitized elements for use in taking photographs.

Figure 5 shows another attachment for use in connection with the dark chambered apparatus of Figure 4. In this figure a frame 39 is shown and is adapted for interchangeable positioning with the frame 35. The frame 39 is provided with a guide way 40 therethrough for slidably receiving transparent films 41 or the like which may bear positive or negative configurations to be projected. The frame 39 carries a rearwardly extending housing 42 in which is mounted a condensing lens 43 and which carries, in the rear end of the housing 42 a lamp 44 or other source of illumination for emitting light rays to be projected through the lens 43, transparent film 41 and through the objective 14.

It is obvious that various changes and modifications may be made in the details of construction and design of the above specifically described embodiment of this invention without departing from the spirit thereof, such changes and modifications being restricted only by the scope of the following claim.

What is claimed is:—

Means for converting an opaque projector, having a casing provided with ventilating openings therein, an objective and laterally disposed sources of light, into a camera; comprising an open ended dark chamber removably fitted in the casing inwardly of said sources of light and with one end closed about the objective and its other end opening through the back of the casing to seal the interior of the dark chamber from light entering through said ventilating openings, and means for supporting a sensitized plate at the back of the casing and in the focal plane of the objective and in line with said dark chamber.

In testimony whereof I affix my signature.

JOSEPH M. REYES.